May 29, 1956　　H. C. BRUNNER ET AL　　2,748,340
EXCITATION SYSTEM FOR A VARIABLE FREQUENCY GENERATOR
Filed Nov. 19, 1952
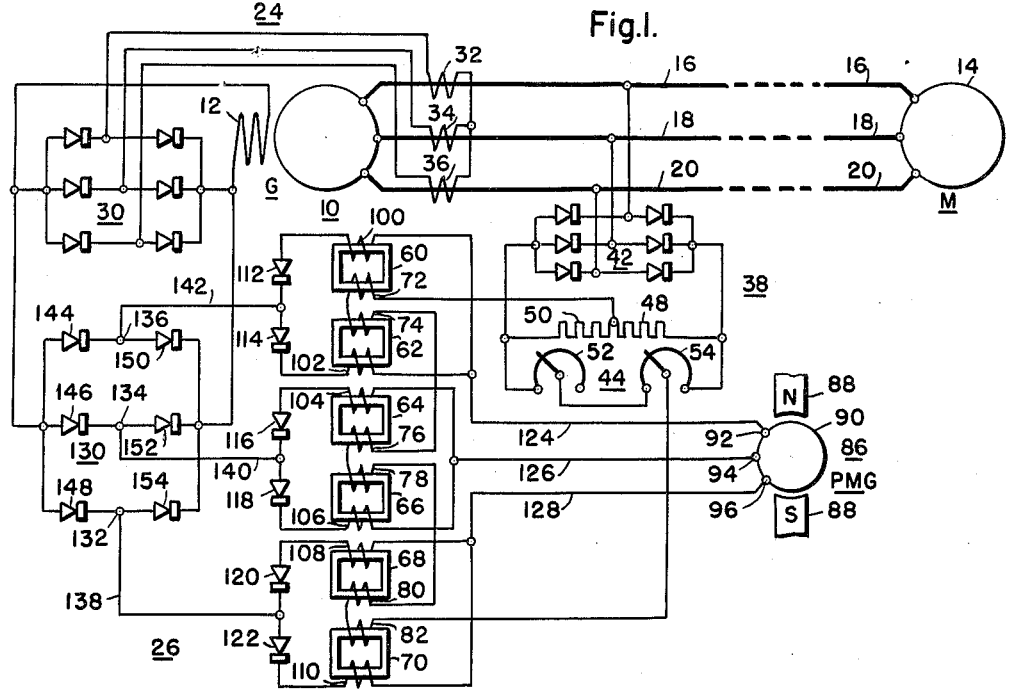
Fig.1.
Fig.2.
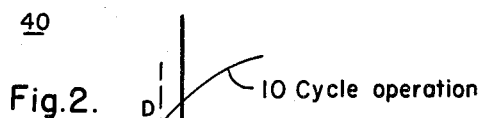
WITNESSES:
INVENTORS
Harry C. Brunner
and Schuyler L. Bradley.
BY
ATTORNEY C# United States Patent Office 2,748,340
Patented May 29, 1956

2,748,340

EXCITATION SYSTEM FOR A VARIABLE FREQUENCY GENERATOR

Harry C. Brunner and Schuyler L. Bradley, Pittsburgh, Pa., assignors to Westinghouse Electric Corporation, East Pittsburgh, Pa., a corporation of Pennsylvania Application November 19, 1952, Serial No. 321,338

5 Claims. (Cl. 322—24)

This invention relates to excitation systems and, more particularly, to such excitation systems suitable for use with a variable frequency generator that supplies energy to a load located a considerable distance from the generator.

When supplying energy from a variable frequency generator to a load, such as a squirrel cage motor located remote from the generator, certain problems exist which do not exist if the generator and motor were located in proximity to one another. For instance, when the generator and motor are located a considerable distance from one another, the line voltage drop along the cables that interconnect the motor and generator represent a fairly large percentage of the generated voltage. Therefore, assuming the generator output voltage is 450 volts at 60 cycles and 75 volts at 10 cycles (constant volts per cycle), the line voltage drop is then a very large percentage of the generator output voltage at 10 cycles. Assuming further that the motor is a squirrel cage induction motor and it is desired to accelerate and decelerate the motor rapidly so that it will cover its speed range within a predetermined period of time, then it is necessary that sufficient voltage be available at the squirrel cage motor at the lower frequencies of the generator. In order to accomplish this, some means must, therefore, be provided to increase the magnitude of this voltage at the motor at the lower frequencies of the generator so that it will be enabled to accelerate and decelerate the motor at such a rate as to cover the speed range of the motor within the predetermined time. Thus, the generator under such circumstances of a remote load must produce not constant volts per cycle but rather more volts per cycle at the lower frequency range of the generator.

An object of this invention is to provide control means for compensating for the line voltage drop that results from a variable frequency generator supplying power through the line to a remotely disposed motor to thus produce sufficient voltage at lower generator frequencies to thereby obtain a high rate of acceleration and deceleration of the motor at these lower generator frequencies.

Another object of this invention is to provide a compact and efficient excitation system which has a higher volt per cycle generator output at lower generator frequencies than at the higher generator frequencies by utilizing two special sources of excitation for the generator and so correlating them as to produce the desired result.

A more specific object of this invention is to provide for obtaining a higher volt per cycle generator output at lower generator frequencies than at the higher generator frequencies by utilizing two special sources of excitation for the generator, one of which is responsive to generator load current, and the other of which is responsive to the voltage output of the generator to thereby produce a negative control voltage for a magnetic amplifier supplying field excitation to the generator.

Other objects of this invention will become apparent from the following description when taken in conjunction with the accompanying drawing, in which:

Figure 1 is a schematic diagram of an excitation system illustrating an embodiment of the teachings of this invention; and Fig. 2 is a graph illustrating the manner in which the output current of a magnetic amplifier, incorporated into the excitation system of this invention, varies with changes in the control current applied to the magnetic amplifier.

Referring to Fig. 1 of the drawing, there is illustrated a variable frequency generator 10, having a field winding 12, and supplying three-phase alternating current to a squirrel cage induction motor 14 through the line conductors 16, 18 and 20. The generator 10 is located a considerable distance from the motor 14, and it is necessary that the voltage at the terminals of the motor 14 be of sufficient magnitude when the output voltage of the generator 10 is at the lower end of the frequency range of the generator 10 to accelerate and decelerate the motor 14 at a high rate. In order to accomplish this, two special excitation circuits 24 and 26 for the generator 10 are provided. By providing these two special excitation circuits 24 and 26, the generator 10 is capable of producing a special voltage output characteristic, that is, one which has a larger volt per cycle output at the lower end of the frequency range than at the higher end of the frequency range of the generator 10.

The purpose of the excitation circuit 24 is to provide at the upper end of the frequency range of the generator 10 the excitation required by the current loading on the generator 10. The amount of excitation furnished the generator 10 by the excitation circuit 24 at the lower end of the frequency range of the generator 10 will be discussed hereinafter. As illustrated, the excitation circuit 24 comprises a three-phase dry-type rectifier 30, the output terminals of which are electrically connected across the field winding 12 of the generator 10, and three current transformers 32, 34 and 36, which are electrically connected to the input terminals of the three-phase rectifier 30, and are electrically associated with the line conductors 16, 18 and 20, respectively, so as to be responsive to the flow of load current therethrough.

When the frequency of the output voltage of the generator 10 is lowered from, for instance, 60 cycles to 10 cycles, both the voltage appearing at the motor 14 and the magnitude of the load current flowing through the line conductors 16, 18 and 20 is considerably reduced. In fact, there is such a reduction in the magnitude of the voltage appearing at the motor 14 at the ltower frequency range of the generator 10, due to the voltage drop along the line conductors 16, 18 and 20, that the voltage is not sufficient to rapidly accelerate and decelerate the motor 14 at the lower end of the frequency range of the generator 10.

It is to be noted that with a decrease in the load current through the line conductors 16, 18 and 20 the excitation circuit 24 is incapable of supplying sufficient excitation for the generator 10 to produce the desired voltage at the motor 14 for purposes of rapid acceleration and deceleration of the motor. Therefore, the excitation circuit 26 is provided to compensate for the line voltage drop along the line conductors 16, 18 and 20, and it functions to produce sufficient excitation for the generator 10 so as to increase the voltage at the terminals of the motor 14 to such a value that the motor 14 will accelerate and decelerate rapidly at the lower frequencies.

As illustrated, the excitation circuit 26 comprises two main components, namely, a bridge circuit 38 and a three-phase magnetic amplifier 40. In particular, the bridge circuit 38 comprises a three-phase dry-type rectifier 42 and a Wheatstone bridge 44. In order to render the bridge circuit 38 responsive to the output voltage of the generator 10, the line conductors 16, 18 and 20 are connected to the input terminals of the rectifier 42, the output terminals of the rectifier 42 being connected to the input terminals of the Wheatstone bridge 44. In this instance, the legs of the Wheatstone bridge 44 comprise resistors 48 and 50, and adjustable verniers or resistors 52 and 54. By providing the Wheatstone bridge 44 and the adjustable verniers 52 and 54, the output voltage of the Wheatstone bridge 44 can be readily adjusted to zero magnitude which is highly desirable in order to get a maximum of output from the magnetic amplifier 40.

The three-phase magnetic amplifier 40 is electrically connected across the output terminals of the Wheatstone bridge 44 in order to effectively amplify the output from the Wheatstone bridge 44 and thus the output from the generator 10 to thereby obtain sufficient power for supplying a given percentage of the excitation for the generator 10. In this instance, the magnetic amplifier 40 comprises a plurality of magnetic core members 60, 62, 64, 66, 68 and 70. In order to vary the magnetic saturation of the core members 60, 62, 64, 66, 68 and 70, in accordance with the potential across the output terminals of the Wheatstone bridge 44, a plurality of control windings 72, 74, 76, 78, 80 and 82 are disposed in inductive relation with the core members 60, 62, 64, 66, 68 and 70, respectively, the control windings being connected in series circuit relation with one another across the output terminals of the Wheatstone bridge 44.

In order to supply high frequency alternating current energy for the magnetic amplifier 40 and thus permit the use of a smaller-sized magnetic amplifier 40 and in order to obtain a higher speed of response for the magnetic amplifier 40, a permanent magnet pilot exciter 86 is provided. As illustrated, the permanent magnet pilot exciter 86 comprises a rotor 88 and a three-phase stator 90 having terminals 92, 94 and 96.

As illustrated, reactor windings 100, 102, 104, 106, 108 and 110 are disposed in inductive relation with the magnetic core members 60, 62, 64, 66, 68 and 70, respectively. In this instance, each of the reactor windings 100, 102, 104, 106, 108 and 110 are connected in series circuit relation with their respective self-saturating rectifiers 112, 114, 116, 118, 120 and 122 to thereby permit the flow of current in only one direction through the reactor windings. The rectifiers 112 and 114 are poled oppositely, and the series circuit comprising the rectifier 112 and the reactor winding 100, and the rectifier 114 and the reactor winding 102, are connected in parallel circuit relation with one another, the junction point of the reactor windings 100 and 102 being connected to the terminal 92 of the permanent magnet pilot exciter 86 by means of a conductor 124. In like manner, the rectifier 116 and the reactor winding 104 are connected in series circuit relation, as well as the rectifier 118 and the reactor winding 106, the latter two series circuits being connected in parallel circuit relation with one another. As illustrated, the rectifiers 116 and 118 are poled oppositely, and the junction point of the reactor windings 104 and 106 is electrically connected to the terminal 94 of the permanent magnet pilot exciter 86 by means of a conductor 126. The rectifier 120 and the reactor winding 108 are also connected in series circuit relation, this latter series circuit being connected in parallel circuit relation with a series circuit comprising the rectifier 122 and the reactor 110, the rectifiers 120 and 122 being oppositely poled. The remaining terminal 96 of the permanent magnet pilot generator 86 is connected to the junction point of the reactor windings 108 and 110 by means of a conductor 128.

In order to rectify the output of the magnetic amplifier 40, a three-phase dry-type rectifier 130 having input terminals 132, 134 and 136 is provided. As illustrated, a conductor 138 is connected to the junction point of the rectifiers 120 and 122 and to the terminal 132 of the rectifier 130. In like manner, a conductor 140 is connected to the junction point of the rectifiers 116 and 118 of the magnetic amplifier 40 and to the terminal 134 of the rectifier 130. Another conductor 142 is connected to the junction point of the rectifiers 112 and 114 of the magnetic amplifier 40 and to the terminal 136 of the rectifier 130. In this instance, the three-phase rectifier 130 comprises a plurality of rectifiers 144, 146, 148, 150, 152 and 154.

In order to produce across the field winding 12 of generator 10 a voltage that is proportional to the output voltage of the magnetic amplifier 40 and rectifier 130, the output terminals of the rectifier 130 are electrically connected across the field winding 12.

For the purpose of more clearly understanding the sequence of flow of current through the reactor windings 100, 102, 104, 106, 108 and 110 of the magnetic amplifier 40, the circuits will be traced. The path of the current for one phase in which the current flows from terminal 96 to terminal 94 extends from the terminal 96 through the conductor 128, the reactor winding 108 of the magnetic amplifier 40, the rectifier 120, the conductor 138, the rectifier 154 of the rectifier 130, the field winding 12 of the generator 10, the rectifier 146 of the rectifier 130, the conductor 140, the rectifier 118 of the magnetic amplifier 40, the reactor winding 106, and the conductor 126 to the terminal 94 of the permanent magnetic pilot exciter 86. Moving to the next phase, current will flow from the terminal 94 through the conductor 126, the reactor winding 104 of the magnetic amplifier 40, the rectifier 116, conductor 140, the rectifier 152 of the rectifier 130, the field winding 12 of the generator 10, the rectifier 144 of the rectifier 130, the conductor 142, the rectifier 114 of the magnetic amplifier 40, the reactor winding 102, and the conductor 124 to the terminal 92 of the pilot exciter 86. Finally, in the third phase, current will flow from the terminal 92 through the conductor 124, the reactor winding 100 of the magnetic amplifier 40, the rectifier 112, the conductor 142, the rectifier 150 of the rectifier 130, field winding 12 of the generator 10, the rectifier 148 of the rectifier 130, the conductor 138, the rectifier 122 of the magnetic amplifier 40, the reactor winding 110, and the conductor 128 to the terminal 96 of the pilot exciter 86.

Although the excitation circuit 26 has been illustrated as comprising a three-phase magnetic amplifier 40 and a three-phase rectifier 130, it is, of course, to be understood that a single-phase magnetic amplifier (not shown) and a single-phase rectifier (not shown) could be used in place of the magnetic amplifier 40 and the rectifier 130. However, the combination of the three-phase magnetic amplifier 40 and the three-phase rectifier 130 has a much higher efficiency than the combination of a single-phase magnetic amplifier and a single-phase rectifier. It is also to be understood that an electronic amplifier (not shown) could be used in place of the magnetic amplifier 40 illustrated. However, an electronic amplifier would not be as compact, would require considerable maintenance, and would be subject to failure when a shock is applied thereto.

In operation, when the frequency of the output voltage of the generator 10 is at the upper end of the frequency range of the generator 10, such as at 60 cycles, the excitation circuit 24 is providing the main portion of the excitation for the generator 10. Then as the frequency of the output voltage of the generator 10 and the load on the generator 10 are reduced, the excitation circuit 24 supplies less of the excitation, and the excitation circuit 26 supplies more of the excitation for the generator 10. As the frequency of the output voltage of the generator 10 is reduced further, the excitation circuit 26 supplies still more of the excitation for the generator 10, and the excitation circuit 24 supplies still less of the excitation. When the frequency of the output voltage of the generator 10 reaches a predetermined value, the current transformers 32, 34 and 36 saturate, and below this frequency value, the additional required excitation of the generator 10 is supplied by the excitation circuit 26. However, down to the point where the current transformers 32, 34 and 36 saturate, the excitation circuit 24 is able to provide a field forcing action to assist in rapid acceleration and deceleration of the motor 14.

Assuming the frequency of the output voltage of the generator 10 is in its upper range, the output current of the Wheatstone bridge 44 will be in such a direction as to produce a flux in the core members 60, 62, 64, 66, 68, and 70, which opposes the flux produced by the current flow through the reactor windings 100, 102, 104, 106, 108 and 110, respectively. When the frequency of the output voltage of the generator 10 decreases, the voltage appearing across the output of the generator 10 likewise decreases to thereby decrease the voltage across the input terminals of the rectifier 42 of the bridge circuit 38. With a decrease in the input voltage to the rectifier 42, the Wheatstone bridge 44 is unbalanced in such a direction as to decrease the current flow through the control windings 72, 74, 76, 78, 80 and 82. With a decrease in the current flow through the control windings 72, 74, 76, 78, 80 and 82, there is effected an increase in the magnetic saturation of the core members 60, 62, 64, 66, 68 and 70, respectively, to thereby increase the magnitude of the output current from the magnetic amplifier 40 and thus increase the magnitude of the field excitation as produced by the excitation circuit 26. Such an action increases the output voltage of the generator 10 to thereby maintain the output voltage at the terminals of the motor 14 at such a magnitude as to obtain a rapid deceleration of the motor 14.

The manner in which the output current of the magnetic amplifier 40 changes with a decrease in the frequency of the output voltage of the generator 10 and thus with a decrease in magnitude of the control current flowing through the control windings 72, 74, 76, 78, 80 and 82, respectively, can be clearly seen in Fig. 2 of the drawing. Referring to Fig. 2, when the output voltage of the generator 10 is at 60 cycles, the magnitude of the output current from the magnetic amplifier 40 is represented by XY. However, when the frequency of the output voltage of the generator 10 is reduced to 10 cycles, the control current through the control windings 72, 74, 76, 78, 80 and 82 is reduced to the value AB, and the output current of the magnetic amplifier 40 is increased to the value CD.

On the other hand, if it is desired to rapidly accelerate the motor 14 by increasing the frequency of the output voltage of the generator from 10 to 60 cycles, additional voltage is also provided at the terminals of the motor 14 by means of the excitation circuit 26 for purposes of rapidly accelerating the motor 14 from its lower speed limit to its upper speed limit.

The excitation system illustrated in Fig. 1 has the advantage that it comprises static components which are extremely compact. Thus, there is very little or substantially no maintenance problems. In addition, these components are such as to withstand shock extremely well. Further, owing to the small size of the apparatus, its original cost of manufacture is low.

Since certain changes may be made in the above construction, and different embodiments of the invention may be made without departing from the scope thereof, it is intended that all matter contained in the above description or shown in the accompanying drawing shall be interpreted as illustrative and not in a limiting sense.

We claim as our invention:

1. In an excitation system for a variable frequency generator in which the variable frequency generator supplies power to a load remote from the variable frequency generator, the combination comprising, two excitation circuits for the variable frequency generator, one of said two excitation circuits being responsive to generator load current, and the other of said two excitation circuits comprising a rectifier having an input and an output, the input of the rectifier being responsive to the output voltage of the variable frequency generator, a bridge circuit having an input and an output, the output of the rectifier being connected to the input of the bridge circuit, an amplifier having a control input and an output, the output of the amplifier being connected to supply a portion of the generator excitation, and circuit means for connecting the output of the bridge circuit to the control input of the amplifier so as to control the output of the amplifier in accordance with the output current of the bridge circuit.

2. In an excitation system for a variable frequency generator in which the variable frequency generator supplies power to a load remote from the variable frequency generator, the combination comprising, two excitation circuits for the variable frequency generator, one of said excitation circuits being responsive to generator load current, and the other of said two excitation circuits comprising a rectifier having an input and an output, the input of the rectifier being responsive to the output voltage of the variable frequency generator, a bridge circuit having an input and an output, the output of the rectifier being connected to the input of the bridge circuit, a magnetic amplifier having a control input and an output, the output of the magnetic amplifier being connected to supply a portion of the generator excitation, and circuit means for connecting the output of the bridge circuit to the control input of the magnetic amplifier so as to control the output from the magnetic amplifier in accordance with the output current of the bridge circuit.

3. In an excitation system for a variable frequency generator in which the variable frequency generator supplies power to a load remote from the variable frequency generator, the combination comprising, two excitation circuits for the variable frequency generator, one of said two excitation circuits being responsive to generator load current, and the other of said two excitation circuits comprising a magnetic amplifier for supplying a portion of the variable frequency generator excitation and means comprising a rectifier responsive to the output voltage of the variable frequency generator and a Wheatstone bridge responsive to the output of the rectifier for obtaining a control current for the magnetic amplifier which effects an increase in the generator's excitation with a decrease in the frequency of the variable frequency generator, whereby the volts per cycle output for the variable frequency generator is higher for lower generator frequencies than it is for higher generator frequencies.

4. In an excitation system for a variable frequency generator in which the variable frequency generator supplies power to a load remote from the variable frequency generator, the combination comprising, two excitation circuits for the variable frequency generator, one of said two excitation circuits being responsive to the generator load current, and the other of said two excitation circuits comprising a three-phase rectifier having input terminals and an output for supplying a portion of the generator excitation, a three-phase magnetic amplifier having a control input and an output, the output of the three-phase magnetic amplifier being connected to the input terminals of the three-phase rectifier, a permanent magnet generator for supplying alternating-current energy to the three-phase magnetic amplifier, another rectifier having an input and an output, the input of said another rectifier being responsive to the output voltage of the variable frequency generator, a bridge circuit having an input and an output, the output of the said another rectifier being connected to the input of the bridge circuit, and circuit means for connecting the output of the bridge circuit to the control input of the three-phase magnetic amplifier so as to control the output of the three-phase magnetic amplifier in accordance with the output current of the bridge circuit.

5. In an excitation system for a variable frequency generator in which the variable frequency generator supplies power to a load remote from the variable frequency generator, the combination comprising, two excitation circuits for the variable frequency generator, one of said two excitation circuits being responsive to the generator load current, and the other of said two excitations comprising a three-phase rectifier having input terminals and an output for supplying a portion of the generator excitation, a three-phase magnetic amplifier having a control input and an output, the output of the three-phase magnetic amplifier being connected to the input terminals of the three-phase rectifier, a permanent magnet generator for supplying alternating-current energy to the three-phase magnetic amplifier, another rectifier having an input and an output, the input of said another rectifier being responsive to the output voltage of the variable frequency generator, a Wheatstone bridge having an input and an output, the output of the said another rectifier being connected to the input of the Wheatstone bridge, and circuit means for connecting the output of the Wheatstone bridge to the control input of the three-phase magnetic amplifier so as to control the output of the three-phase magnetic amplifier in accordance with the output current of the Wheatstone bridge.

References Cited in the file of this patent

UNITED STATES PATENTS

| | | |
|---|---|---|
| 2,571,827 | Bradley | Oct. 16, 1951 |
| 2,631,268 | Ranson et al. | Mar. 10, 1953 |
| 2,644,127 | Bradley | June 30, 1953 |